UNITED STATES PATENT OFFICE.

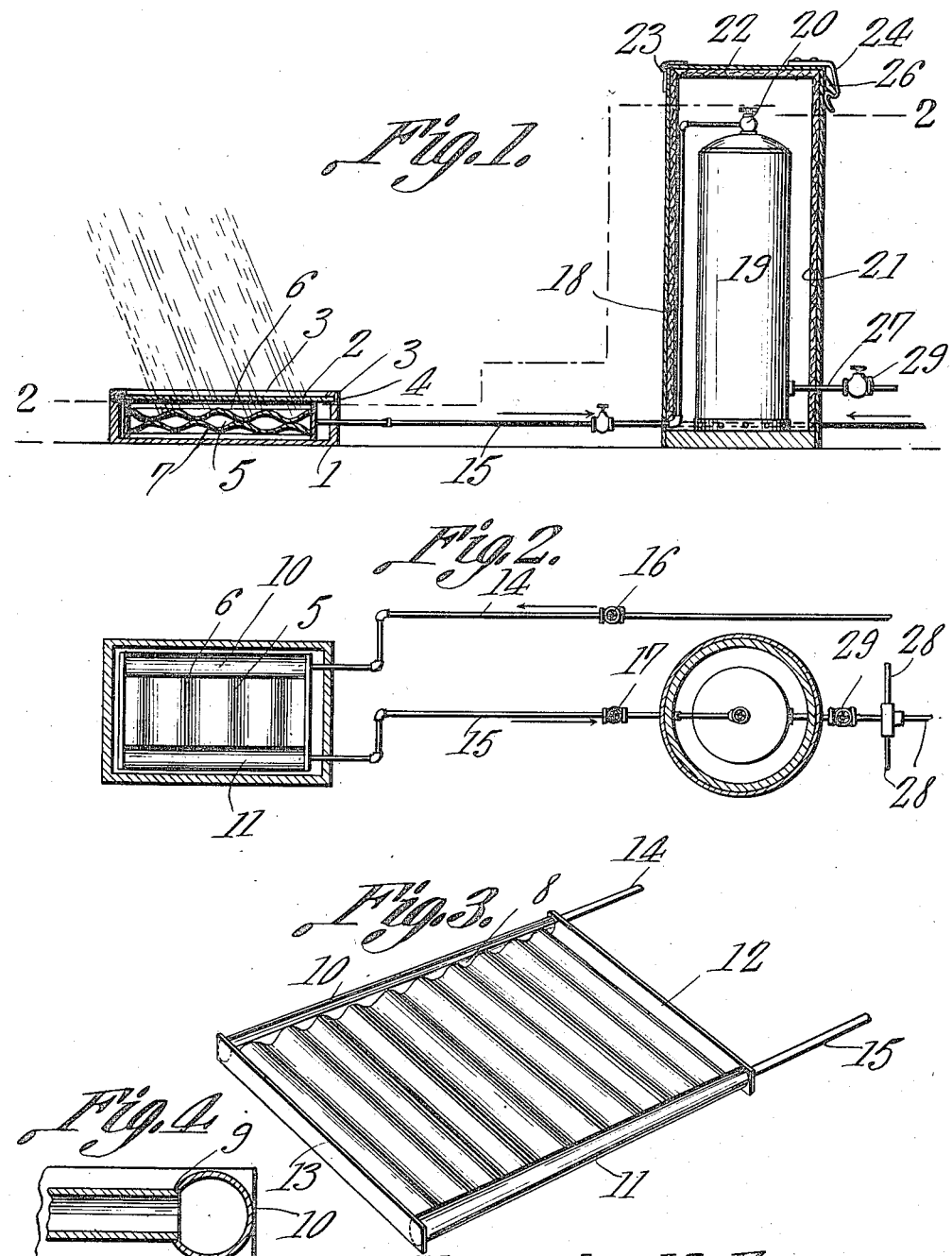

ALEXANDER H. EVANS, OF FREEPORT, ILLINOIS.

DEVICE FOR UTILIZING SOLAR HEAT.

1,042,418.      Specification of Letters Patent.   Patented Oct. 29, 1912.

Application filed September 13, 1910. Serial No. 581,789.

*To all whom it may concern:*

Be it known that I, ALEXANDER H. EVANS, a citizen of the United States, residing at Freeport, in the county of Stephenson and State of Illinois, have invented a new and useful Device for Utilizing Solar Heat, of which the following is a specification.

This invention relates to a new and useful device for utilizing solar heat, whereby a quantity of water may be easily and readily heated, and then stored for the purpose of being conveyed to various localities for use.

The invention aims as its essential object to provide a device of this design, in which an incasement is employed to contain the water to be heated. For example the incasement is made air tight, and is provided upon its interior with an apparatus having transverse passage ways, into which the water is advanced. These transverse passage ways are formed by the provision of a pair of corrugated sheet metal plates.

A further feature of this invention is the production of longitudinal slotted pipes, into the slots of which the corrugated plates are brazed, for allowing the water to enter the passage ways.

A further object of the invention, resides in means for storing the heated water. This means comprises a storage tank, inclosed by a casing having a felt lining, in order to confine the heat. This casing is provided with a hinged closure and a catch therefor, whereby access may be had to the interior of the casing.

The water is conveyed from any suitable source of supply (not shown) through one pipe to the incasement (which is provided with a glass top); it is then carried from the incasement to the storage tank, from which it may be utilized as desired. These pipes are provided with suitable valves whereby the inflow and the outflow of the water may be easily controlled.

The drawing only discloses one form of the present invention, but however in practical fields this form may necessitate slight alterations, to which the applicant is entitled, provided the alterations are comprehended by appended claims.

With these and other objects in view, the invention consists of further details and combination of parts, which will be hereinafter set forth, shown in the drawing and pointed out in the claims.

In the drawings—Figure 1 is a view in section of the apparatus, showing the various features of the invention. Fig. 2 is a sectional view on lines 2—2 of Fig. 1, showing the storage tank in plan view, the pipes for allowing the water to advance to the heater and from the same, and further showing the device composed of the corrugated plates arranged within the incasement. Fig. 3 is a perspective view of the device which is located within the incasement. Fig. 4 is a detail view in section of a portion of the device shown in Fig. 3, showing the manner in which the corrugated plates are secured by brazing in the slots of the pipes.

As to the drawings, 1 designates an incasement having a glass cover or top 2. This glass cover or top is secured to the incasement by the strips 3, which form a groove 4 to receive the glass. This glass cover or top is for the purpose of allowing the sun's rays to act direct upon the water containing receptacle 5. This receptacle 5 is composed of a pair of sheet metal corrugated plates 6 and 7, the edges of which are provided with strips or pieces 8, which are arranged between the corrugations upon the upper and lower surfaces of said plates, as shown clearly in Fig. 3. These strips or pieces 8 are brazed in the slots 9 of the pipes 10 and 11, as shown clearly in Fig. 4. 12 and 13 denote plates which are brazed or otherwise connected to the extremities of the pipes 10 and 11, in order to close the ends of said pipes.

To convey the water to the receptacle, and especially to the interior of the pipe 10 a pipe 14 is provided having a valve 16, in order to control the flow of water. The pipe 14 connects with any suitable supply (not shown). After the water has been thoroughly heated, the same is carried from the receptacle by means of the pipe 15 (which is provided with a valve 17 controlling the water). The pipe 15 enters the casing 18 and extends upwardly and over the storage tank 19. The top of the storage tank is provided with a valve 20, with which the pipe 18 connects. By this valve the water may be controlled upon the interior of the casing 18, as well as by the valve 17. This casing 18 is lined upon its inner circumference by a layer of felt, or any other suitable material as for instance asbestos 21, for the purpose of retaining the heat within the interior of the casing and about the storage tank. This casing 18 is provided with a closure 22, hinged at 23 and provided with a spring clasp 24, to engage a hook or projection 26, to permit the closure to be held securely in place. Leading from the storage tank is a pipe 27, whereby the water after being heated and stored may be conveyed to various localities. For example, the storage tank and its casing may be arranged in a dwelling or other structure, preferably in the upper portion thereof, while the heater may be arranged upon the roof, in order to permit the sun's rays to squarely shine thereupon. The pipe 27 is primarily used for connecting with a plurality of pipes 28, which are designed to communicate and terminate with faucets or spigots at various points throughout the dwelling. By this arrangement water may be conveyed to toilets, the kitchen and other points in the dwelling. The pipe 27 has a valve 29 whereby the water may be controlled to these various locations.

The invention having been set forth, what is claimed as new and useful is:

1. A solar heater, embracing an air-tight incasement having a heat-conducting closure, a receptacle including opposed spaced-apart corrugated metal members, whose edges are provided with strips arranged upon the upper and lower surfaces of said plates, lateral tubular members having longitudinal slots, within which slots are brazed said strips, plates secured to, and forming closures for the ends of said tubular members, supply and delivery pipes connected to said tubular members, and a tank, said delivery pipe also connecting with said tank, at its upper end.

2. A solar heater, including an air-tight incasement, a heat-conducting closure for said incasement, said incasement comprising opposed corrugated metal-members, having alternate contacting and spaced apart surfaces, adapted to form numerous tubes, said contacting surfaces being in the median line of the incasement, lateral tubular members having longitudinal slots, said corrugated tube-forming members having communication with said lateral tubular members through the slots of the latter, filling-in members between said corrugated members and the opposed edges or walls of said slots, and end-plate closures for said lateral tubular members, an incased storage tank, pipe connection between one of said slotted lateral tubular members and said storage tank, and circulation pipes for said storage tank and the other slotted lateral tubular member.

In testimony that I claim the foregoing as my own, I have hereto affixed my signature in the presence of two witnesses.

ALEXANDER H. EVANS.

Witnesses:
W. C. PFENDER,
H. H. BICKENBACK.